(12) United States Patent
Hall et al.

(10) Patent No.: US 9,988,096 B2
(45) Date of Patent: Jun. 5, 2018

(54) GRILL ASSEMBLY AND METHOD OF ASSEMBLY THEREOF

(71) Applicants: David R. Hall, Provo, UT (US); Stephen R. Hall, Draper, UT (US); Christopher Johnson, Provo, UT (US); Jason Simpson, Provo, UT (US); Eric Magleby, Provo, UT (US)

(72) Inventors: David R. Hall, Provo, UT (US); Stephen R. Hall, Draper, UT (US); Christopher Johnson, Provo, UT (US); Jason Simpson, Provo, UT (US); Eric Magleby, Provo, UT (US)

( * ) Notice: Subject to any disclaimer, the term of this patent is extended or adjusted under 35 U.S.C. 154(b) by 266 days.

(21) Appl. No.: 15/145,141

(22) Filed: May 3, 2016

(65) Prior Publication Data

US 2017/0320525 A1    Nov. 9, 2017

(51) Int. Cl.
| | | |
|---|---|---|
| *B62D 25/08* | (2006.01) | |
| *B23K 26/38* | (2014.01) | |
| *B23K 26/00* | (2014.01) | |
| *F24F 13/08* | (2006.01) | |
| *B60K 13/04* | (2006.01) | |
| *B60K 11/08* | (2006.01) | |

(52) U.S. Cl.
CPC .......... *B62D 25/08* (2013.01); *B23K 26/0006* (2013.01); *B23K 26/38* (2013.01); *B60K 11/08* (2013.01); *B60K 13/04* (2013.01); *F24F 13/082* (2013.01)

(58) Field of Classification Search
CPC ... B60R 19/52; B60R 2019/525; B62D 25/08; B60K 11/08
USPC .................................. 296/193.1; 180/68.1
See application file for complete search history.

(56) References Cited

U.S. PATENT DOCUMENTS

| | | | | |
|---|---|---|---|---|
| 6,086,122 A | * | 7/2000 | Dieterich ............... | B60K 11/08 180/68.6 |
| 6,230,832 B1 | * | 5/2001 | von Mayenburg .... | B60K 11/08 180/68.1 |
| 9,586,547 B2 | * | 3/2017 | Maji ....................... | B60R 19/52 |
| 2004/0124670 A1 | * | 7/2004 | Tate ....................... | B60R 19/52 296/193.1 |
| 2014/0110973 A1 | * | 4/2014 | Danev .................. | B62D 25/082 296/193.08 |

* cited by examiner

*Primary Examiner* — Joseph D. Pape

(57) ABSTRACT

Several grill assemblies and methods for assembling the same are claimed and disclosed. In one embodiment, the assembly includes slotted panels with a single deformable wall to fix the slotted panels together. In another embodiment, slotted panels are fixed together using two deformable walls, one deformed subsequently after the other. The general shape of panels and grill assemblies is disclosed. Features of grill assembly members used to mount the grill to separate structural frame members and mount separate assemblies to the grill assembly are also disclosed.

20 Claims, 12 Drawing Sheets

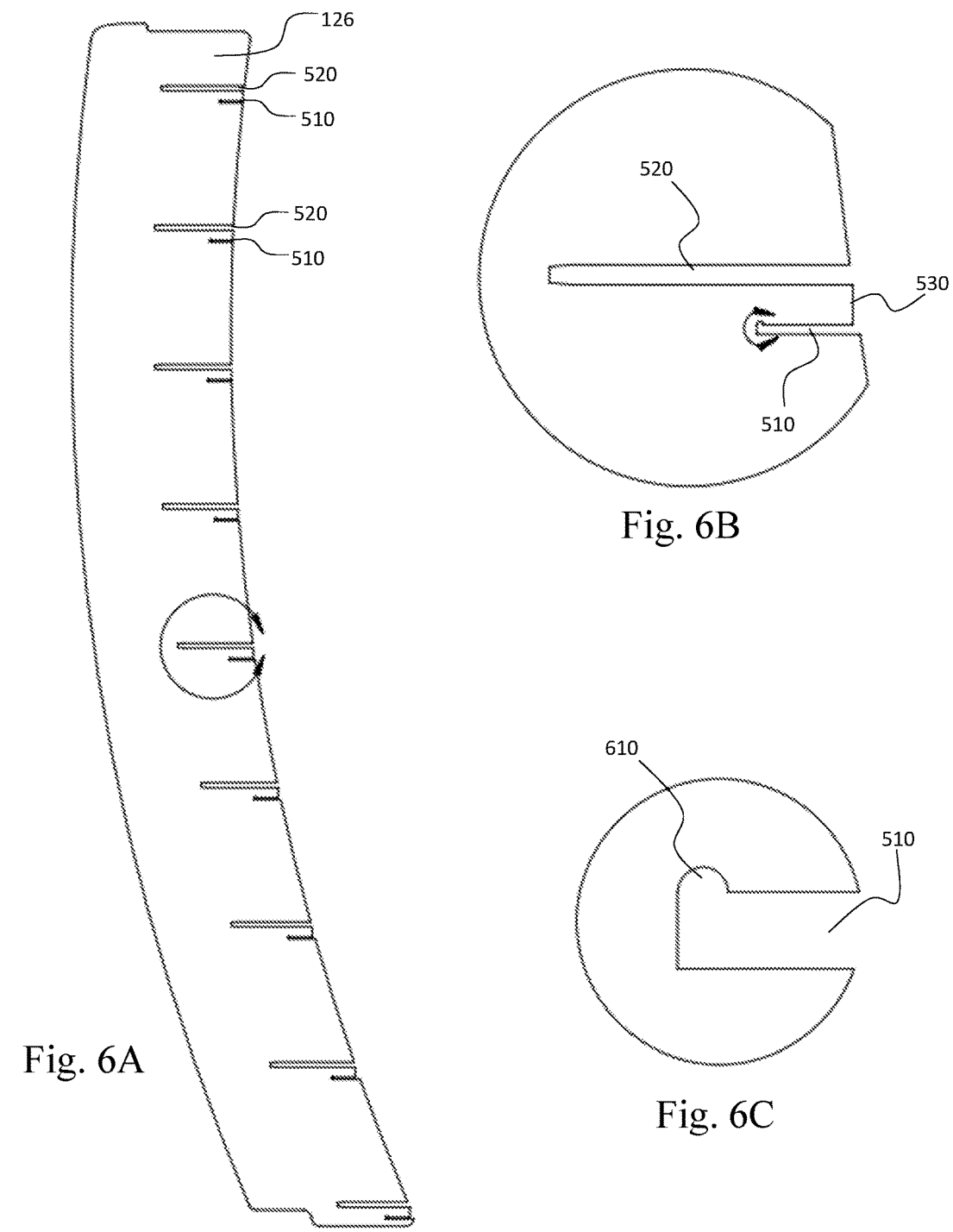

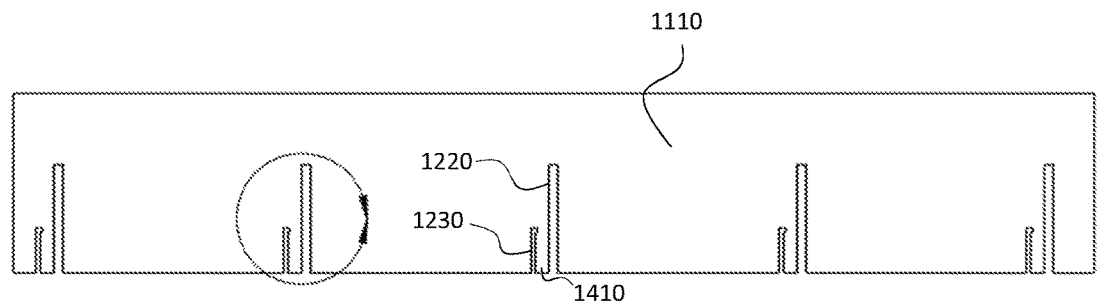
Fig. 14A
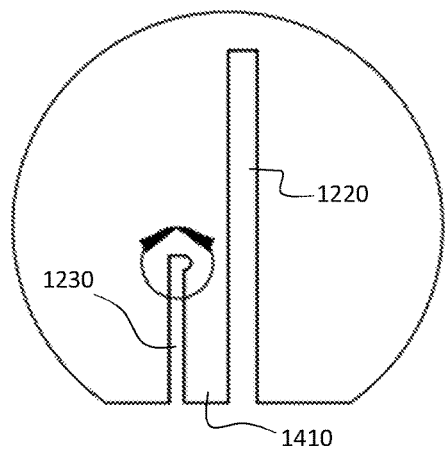 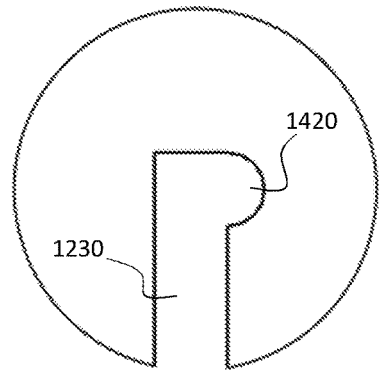
Fig. 14B          Fig. 14C

GRILL ASSEMBLY AND METHOD OF ASSEMBLY THEREOF

BACKGROUND

FIELD OF THE INVENTION

This invention relates to grill assemblies and methods for assembling the same. More specifically, the invention relates to an apparatus capable of fixing grill assembly panels in position relative to each other. The invention has numerous applications in fields including, but not limited to, vehicle grills, ventilation grills, and pipe guard grills.

BACKGROUND OF THE INVENTION

In their various forms, grills are often produced in high quantities. This is especially true of vehicle grills, which are used to both allow airflow into components within the body of the car, especially a radiator or other heat exchanger. These grills sometimes—serve additional purposes, such as directing airflow, protecting vehicle components, and adding aesthetic appeal to the vehicle as a whole. In other fields, grills may be used to direct airflow and filter large debris in air vents and ducts, liquid passageways, or ventilation systems.

In the aforementioned typical grill applications, grills are manufactured in very high quantity (especially for commercial vehicle applications), or are manufactured in preset sizes to fit certain standard ducts, vents, or passages. Often production of grills at high quantities involves manufacturing processes that may have a high initial tooling cost that becomes cost-effective over a long production period. These manufacturing processes also often involve high rates of production. In addition, grills in all applications often have members designed to interface with another body, but do not often incorporate additional interfaces for different assemblies. This is especially true of lightweight vehicle grills, which are often mass-produced using materials and dimensions not suitable for bearing the additional load of outside assemblies. Thus there is a need in the art for grill assemblies which are rigid enough to support other assemblies, have mounting interfaces for other assemblies, and which can be manufactured at lower production rates in a cost-effective manner.

SUMMARY

This invention has been developed in response to the present state of the art and, in particular, in response to the problems and needs in the art that have not yet been fully solved by currently available systems and methods. Accordingly, improved systems and methods have been developed to assemble and install grill assemblies. Features and advantages of different embodiments of the invention will become more fully apparent from the following description and appended claims, or may be learned by practice of the invention as set forth hereinafter.

Consistent with the foregoing, a front vehicle grill assembly, rear vehicle grill assembly, and ventilation grill assembly are disclosed. In one embodiment, grill panels are secured relative to each other using one deformable wall at each intersection of panels. In another embodiment, grill panels are secured relative to each other using two deformable walls at each intersection of panels. Mounting interfaces are provided that allow the grill assemblies to be rigidly attached to separate structural frame members. Mounting interfaces that allow other assemblies to be rigidly attached to the grill assemblies are also provided. A corresponding method for arranging and fixing the position of grill panels in the assemblies is also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIG. 6A is a side view of a second panel used in the vehicle front grill assembly of FIGS. 1-5;

FIG. 6B is a close-up view of a third slot, fourth slot, and first deformable wall of the second panel shown in FIG. 6A;

FIG. 6C is a close-up view of a fourth slot and a first groove shown in the close-up view of FIG. 6B;

FIG. 14A shows a side view of a second panel of the ventilation grill assembly of FIG. 11A;

FIG. 14B shows a close-up view of a third slot, fourth slot, and first deformable wall of the second panel of FIG. 14A;

FIG. 14C shows a close-up view of a first groove of the fourth slot of FIG. 14B;

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Figure 1:
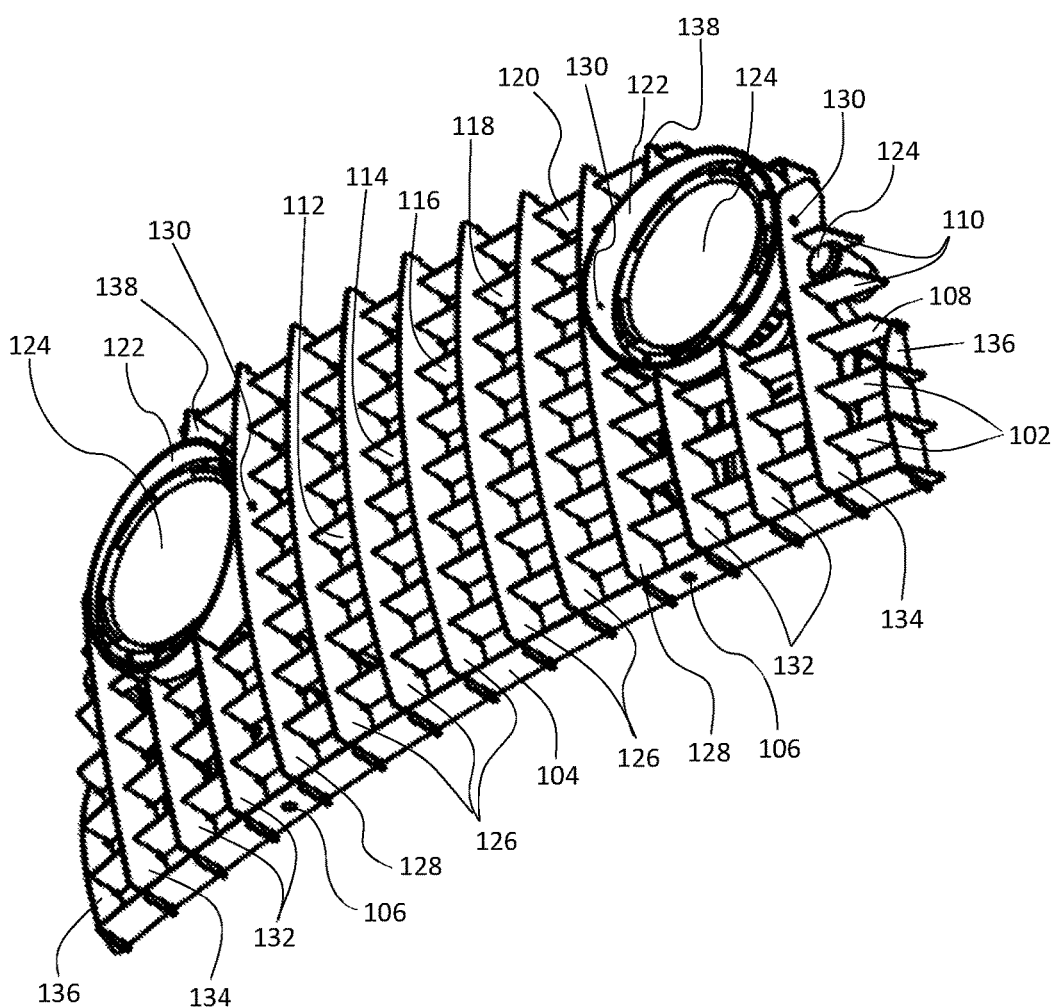
FIG. 1 is a perspective view of a vehicle front grill assembly utilizing an embodiment of the invention.

Referring to FIG. 1, a perspective view showing of a vehicle front grill assembly utilizing one embodiment of the present invention is shown. The vehicle front grill assembly comprises a plurality of first panels and a plurality of second panels. The plurality of first panels further comprise different shapes and sizes of panels all utilizing a plurality of first slots and a plurality of second slots extending inwards from opposed sides, the plurality of first slots having a different depth than the depth of the plurality of second slots. Furthermore, the plurality of first slots and the plurality of second slots share an inline longitudinal axis, as shown in FIG. 4A. First panels of full length 102 span the entire width of the assembly and utilize first slots to interface with other assembly members as will be shown in FIG. 4A. A lower first panel 104 is used to interface with vehicle structural frame members and exists at the bottom of the vehicle front grill assembly to allow rigid attachment of the assembly through use of first though-holes 106. An upper first panel 120 likewise utilizes through-holes to interface with vehicle structural frame members in a manner detailed in FIG. 3. A first mid-section first panel 118 spans the width of space between vehicle headlight assembly housings 122, which contain vehicle headlight assemblies 124 and act as an intermediary interface between vehicle front grill assembly panels and vehicle headlight assemblies 124. A second mid-section first panel 116 is of smaller length than the first mid-section first panel 114. A third mid-section first panel 114 is of smaller length than the second mid-section first panel 116. A fourth mid-section first panel 112 is of greater length than the third mid-section first panel 114 and the second mid-section first panel 116 but smaller length than the first mid-section first panel 118. Small first panels 110 utilize just one first slot and one second slot extending inwards from opposed sides, the first slot and the second slot having a different depth and sharing an inline longitudinal axis. A long first panel 108 is slightly smaller in length than the first panels of full length 102 which span the entire width of the assembly. The various aforementioned first panels 102, 104, 108, 110, 112, 114, 116, 118, 120 are configured such that each are parallel to each other and spaced evenly such that the distance between sides of any two consecutive parallel first panels is equal. The plurality of second panels further comprise different shapes and sizes of panels all utilizing an embodiment of the present invention. Second panels of full length 126 span the full height of the vehicle front grill assembly and interface with first panels 102, 104, 108, 112, 114, 116, 118, 120 in an interlocking, perpendicular manner. Two second panels of full length for interfacing 128 are of the same length as the second panels of full length 126, but also incorporate second through-holes 130 to interface with the vehicle headlight assembly housings 122. Smaller second panels for interfacing 134 are of smaller length than the second panels of full length for interfacing 128 but also incorporate second through-holes 130 to interface with the vehicle headlight assembly housings 122. Mid-sized second panels 132 are of smaller length than second panels of full length 126 sufficient to accommodate space for vehicle headlight assemblies 124 and vehicle headlight assembly housings 122 in the vehicle front grill assembly. Small second panels 138 incorporate only one set of slots of an embodiment of the present invention. Two second panels of a second shape 136 utilize sets of slots of an embodiment of the present invention in the same manner as all other second panels 126, 128, 132, 134, 138 but utilize a panel shape that is different in that one side of the panel is more sharply curved than the others. The various aforementioned second panels 126, 128, 132, 134, 136, 138 are configured such that each are parallel to each other and spaced evenly with that the distance between sides of any two consecutive parallel second panels is equal.

Figure 2:
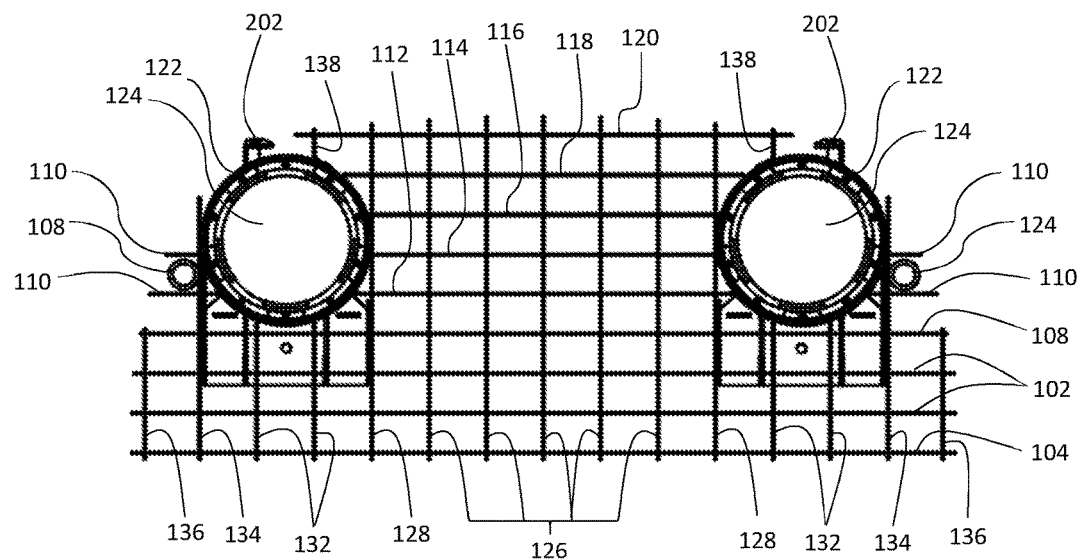
FIG. 2 is a front view of the vehicle front grill assembly shown in FIG. 1.

FIG. 2 shows a front view of the vehicle front grill assembly of FIG. 1. As explained previously, first panels 102, 104, 108, 110, 112, 114, 116, 118, 120 are configured parallel relative to each other and perpendicular relative to second panels 126, 128, 132, 134, 136, 138 which are configured parallel relative to each other. First panels are evenly spaced from each other and second panels are spaced evenly from each other. The vehicle light assemblies 124 are interfaced with vehicle light assembly housings 122. Vehicle light assembly housings 122 are interfaced with small first panels 110, the upper first panel 112, the first mid-section first panel 118, the second mid-section first panel 116, the third mid-section first panel 114, the fourth mid-section first panel 112, second panels of full length for interfacing 128, smaller second panels for interfacing 134, mid-sized second panels 132, and small second panels 138. Vehicle light assembly housings further comprise first interfacing extensions 202, which may interface with other assemblies or with vehicle structural frame members.

Figure 3:
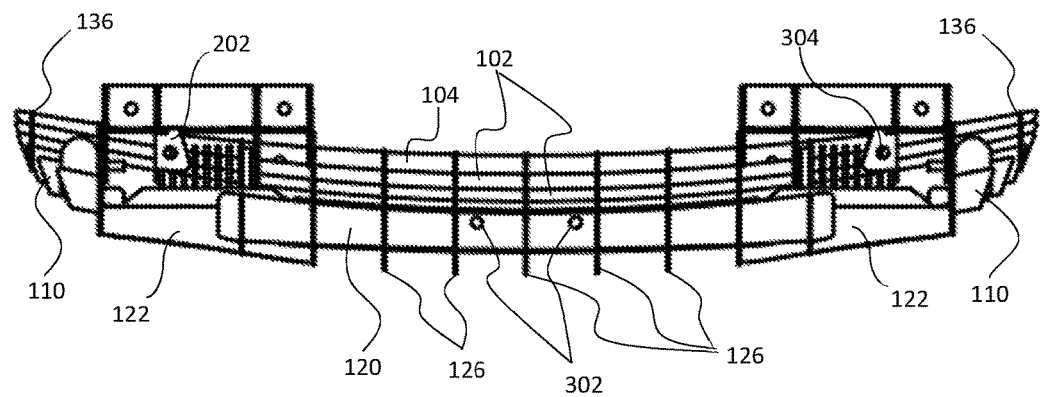
FIG. 3 is a top view of the vehicle front grill assembly shown in FIG. 1.
Figure 4A:
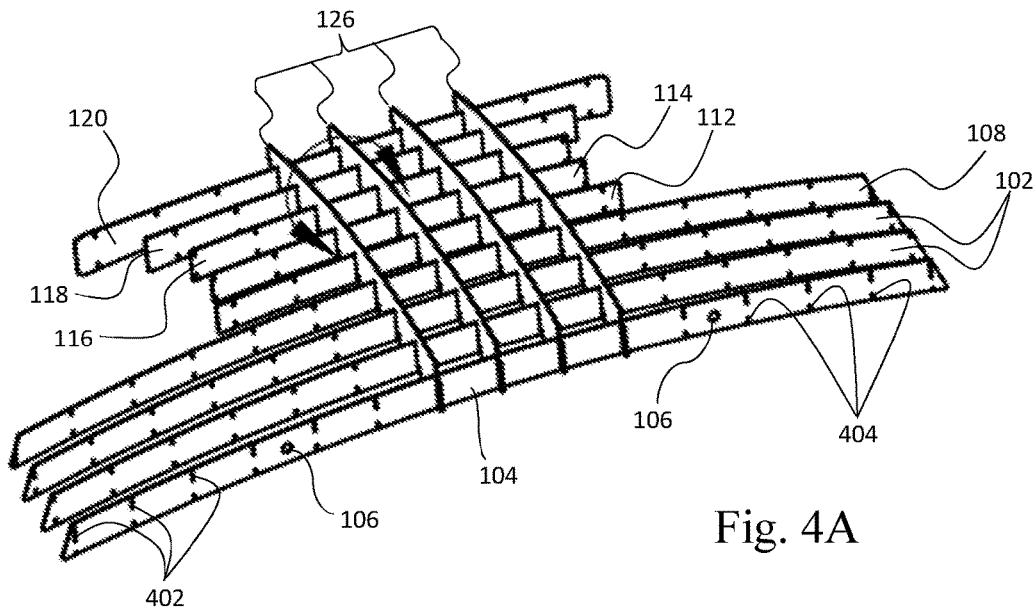
FIG. 4A is a perspective view of a partially assembled vehicle front grill assembly like the front vehicle grill shown in FIG. 1.

FIG. 3 shows a top-down view of the vehicle front grill assembly of FIG. 1. First panels 104, 102, 110, 120 have a generally curved shape such that when assembled, the entire grill takes on a generally curved shape. Second panels 126, 136 also have a generally curved shape such that when assembled, the entire grill takes on a generally curved shape. The upper first panel 120 comprises third through-holes 302 which may interface with vehicle structural frame members. The first interfacing extensions 202 comprise through-holes 304 which may interface with vehicle structural frame members.

FIG. 4A shows a perspective view of a partially assembled vehicle front grill assembly. First panels 102, 104, 108, 112, 114, 116, 118, 120 comprise first slots 402 and second slots 404 extending inwards from opposed sides and sharing an inline longitudinal axis. First slots and second slots are evenly spaced along first panels 102, 104, 108, 112, 116, 118, 120 such that second panels 126 can intersect with said first slots 402 and remain parallel relative to each other and perpendicular relative to first panels 102, 104, 108, 112, 114, 116, 118, 120. First panels 102, 104, 108, 112, 116, 118, 120 intersect with second panels 126 by inserting third slots of second panels shown hereafter in FIG. 6A into first slots 402 of first panels 102, 104, 118, 112, 114, 116, 118, 120. A partially assembled vehicle front grill assembly is required to expose first slots 402 and second slots 404 and visually describe the interfacing of first panels 102, 104, 108, 112, 114, 116, 118, 120 and second panels 126. First slots 402 and second slots 404 should be understood to also be incorporated in first panels 110 not shown in this figure. The interfacing of second panels is likewise represented by second panels 126 but should be understood to also be incorporated in second panels 128, 132, 134, 136, 138 not shown in this figure.

Figure 4B:
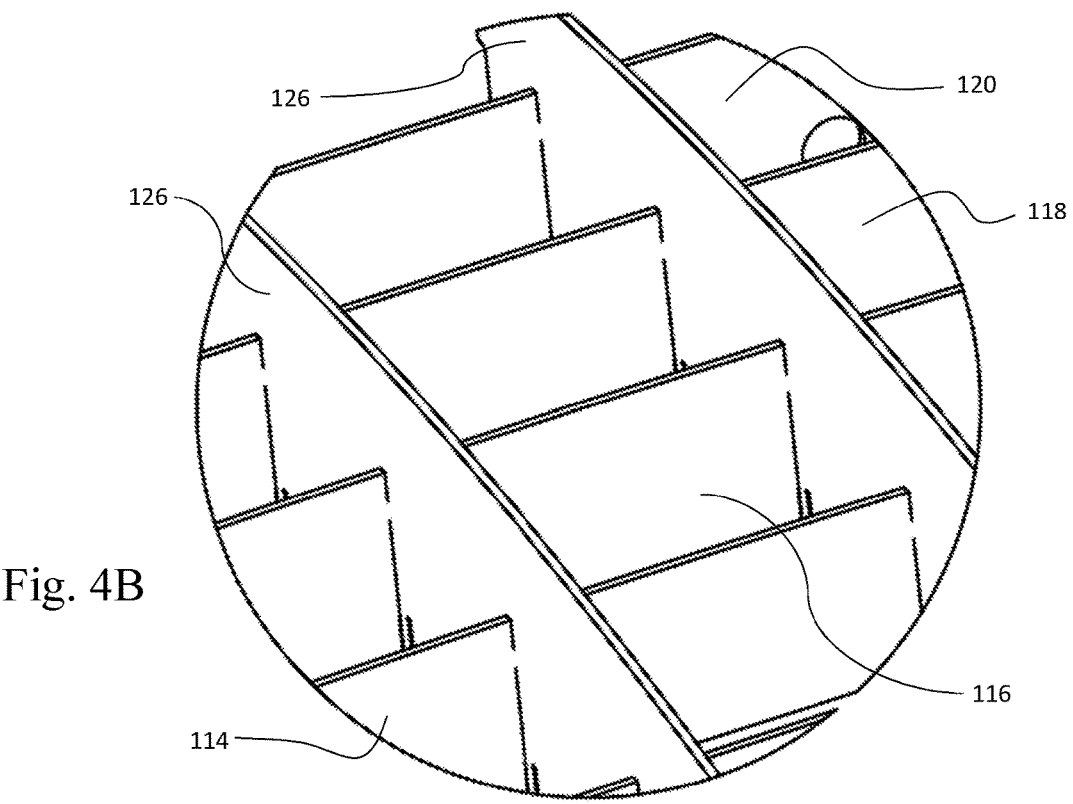
FIG. 4B is a close-up view of first and second panels used in the partially assembled vehicle front grill assembly of FIG. 4A.

FIG. 4B shows a close-up view of the partially assembled vehicle front grill assembly of FIG. 4A. First panels 114, 116, 118, 120 intersect with second panels 126 by means of first slots. Second panels 126 intersect with first panels 114, 116, 118, 120 in such a manner that they protrude from the grill assembly. The protrusion of second panels 126 is representative of all second panels including second panels 128, 132, 134, 136, 138 not shown in this figure, and it should be understood that second panels 128, 132, 134, 136, 138 may likewise protrude from the vehicle front grill assembly.

Figure 5A:
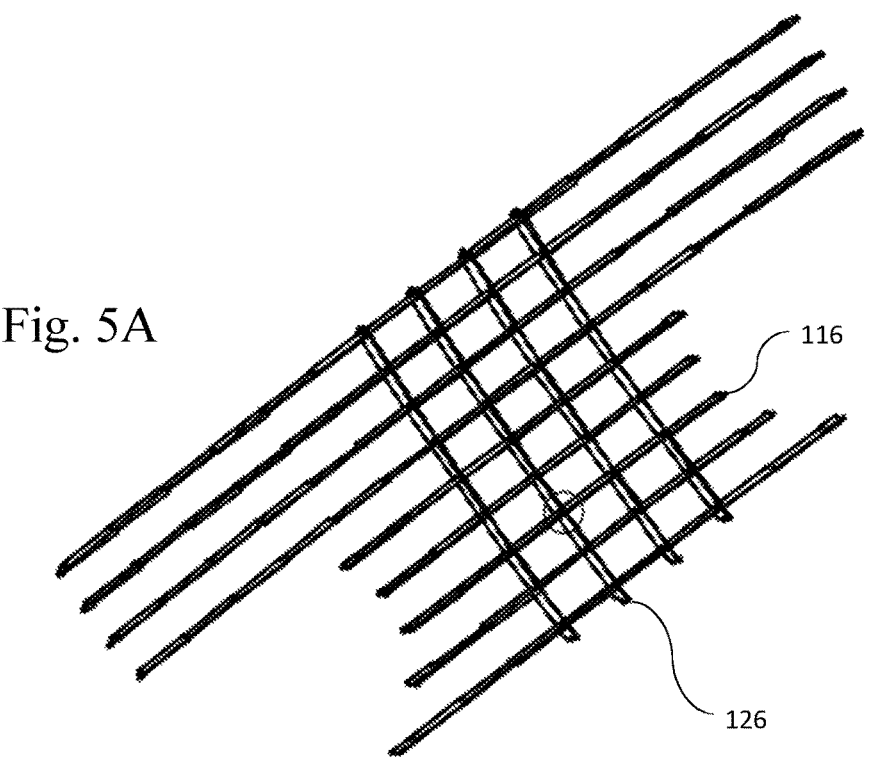
FIG. 5A is a perspective view of the rear side of the partially assembled vehicle front grill assembly of FIG. 4A.
Figure 5B:
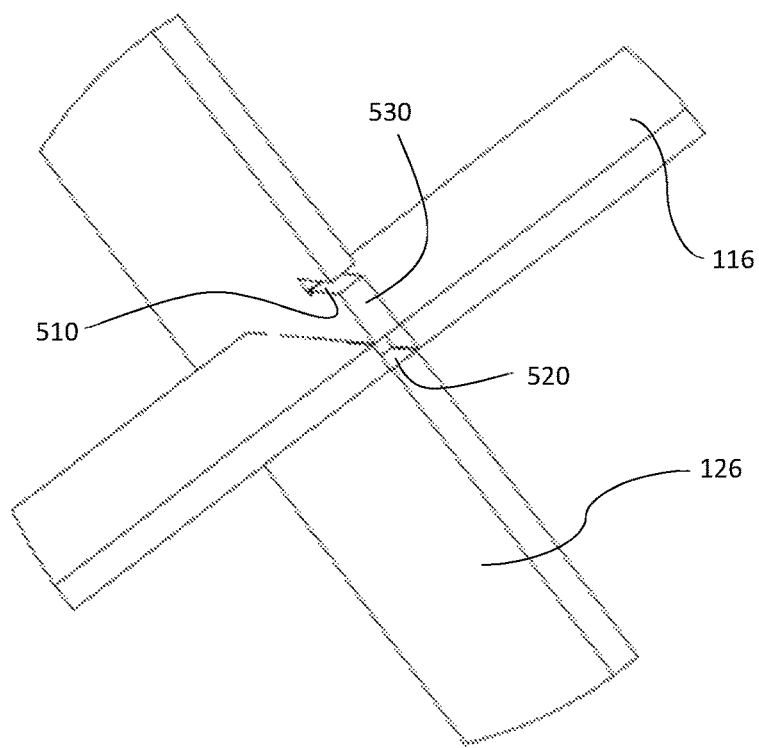
FIG. 5B is a close-up view of the intersection of a first and second panel utilizing one embodiment of the invention in the partially assembled vehicle front grill assembly of FIG. 5A.

FIG. 5A shows a perspective view of the rear side of a partially assembled vehicle front grill assembly. FIG. 5B shows a close-up view of the rear side of the partially assembled vehicle front grill assembly of FIG. 5A. The second mid-section first panel 116 is shown intersected with the second panel of full length 126. Specifically, the third slot 520 of the second panel of full length 126 is inserted into the first slot (shown in FIG. 4A) of the second mid-section first panel 116. A fourth slot 510 of the second panel of full length 126 is also shown. The third slot 520 and fourth slot 510 are separated by a distance such that a first deformable wall 530 is formed. The intersection of the second mid-section first panel 116 and the second panel of full length 126 depicted in FIG. 5B is representative of all other intersections of first slots 402 of all first panels 102, 104, 108, 110, 112, 114, 116, 118, 120 with third slots 520 of all second panels 126, 128, 132, 134, 136, 138 and all other intersections of second slots 404 of all first panels 102, 104, 108, 110, 112, 114, 116, 118, 120, with third slots 520 of all second panels 126, 128, 132, 134, 136, 138. As such, it is to be understood that the scope of this intersection of first slots 402 with third slots 520 is not limited only to the second mid-section first slot 116 and the second panel of full length 126, but may include all other intersections between first panels 102, 104, 108, 110, 112, 114, 116, 118, 120 and second panels 126, 128, 132, 134, 136, 138.

FIG. 6A shows a side view of a single second panel of full length 126. The second panel of full length 126 comprises third slots 520 and fourth slots 510. FIG. 6B shows a close-up view of a third slot 520 and fourth slot 510 forming a first deformable wall 530 between them. FIG. 6C further magnifies the view of FIG. 6B and shows that fourth slots 510 comprise a first groove 610 at their base. The first groove 610 facilitates deformation of the first deformable wall 530 by acting as a stress concentrator and causing the deformable wall to bend on an axis formed between the first groove 610 and third slot 520. The first groove 610 of the fourth slot 510 of the second panel of full length 126 depicted herein is representative of first grooves that may be incorporated into all fourth slots of any first panel. As such, it is to be understood that all first panels 102, 104, 108, 110, 112, 114, 116, 118, 120 may comprise fourth slots 510 with a first groove 610 at the base of each fourth slot 510.

Figure 7A:
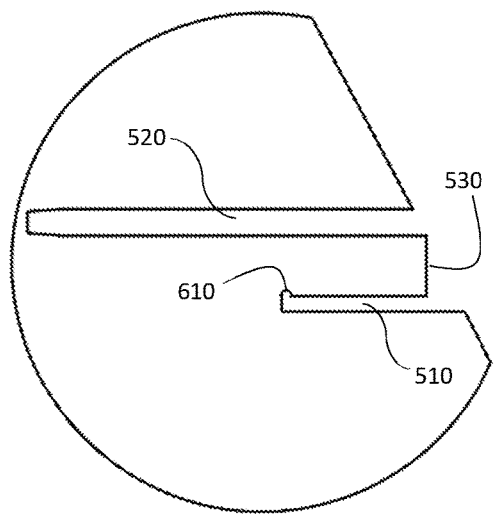
FIG. 7A is a close-up view of a first embodiment of the invention in its pre-assembly state.

FIG. 7A shows a side view of a first embodiment of the present invention used in the vehicle front grill assembly of FIGS. 1-6 in its pre-assembly or undeformed state. What is shown is a third slot 520 and a fourth slot 510 of a second panel, the slots forming a first deformable wall 530 between them. After insertion of a first panel into a second panel at intersections of first and third slots respectively, first and second panels are not yet rigidly fixed in position relative to each other.

Figure 7B:
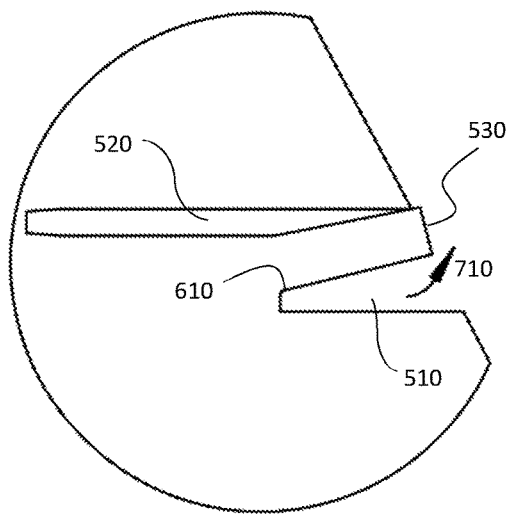
FIG. 7B is a close-up view of the first embodiment of the invention in its post-assembly state.

FIG. 7B shows the same view of the first embodiment of the present invention as FIG. 7A in its post-assembly or deformed state. Once first slots of first panels are inserted into third slots of second panels, the first deformable wall 530 is deformed 710 into the third slot 520. The first deformable wall 530 fills a void created by an intersection of third slots 520 and second slots 404. Once the first deformable wall 530 is in its deformed 710 state, the first and second panels are fixed in position relative to each other at this intersection. The first embodiment of the present invention may be incorporated at any intersection of second and third slots of first and second panels throughout the entire grill assembly. The first embodiment of the present invention may also be used on any grill utilizing a first and second panel and is not limited in scope to a vehicle front grill assembly.

Figure 8A:
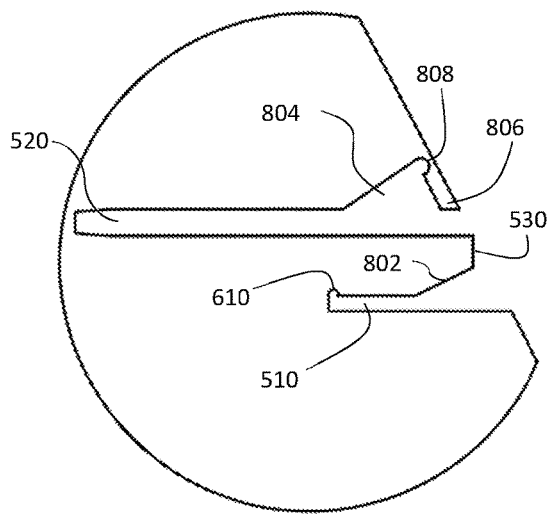
FIG. 8A is a close-up view of a second embodiment of the invention in its pre-assembly state.

FIG. 8A shows a side view of a second embodiment of the present invention used in the vehicle front grill assembly of FIGS. 1-6 in its pre-assembly or undeformed state. What is shown is a second panel comprising a fifth slot 804 extending from the third slot 520 such that a second deformable wall 806 is formed between the fifth slot 804 and the edge of the panel. A second groove 808 is incorporated into the fifth slot 804 to promote bending of the second deformable wall. The first deformable wall 530 comprises a chamfer 802 at its corner closes to the fourth slot 510. After insertion of a first panel into a second panel at intersections of first and third slots respectively, first and second panels are not yet rigidly fixed in position relative to each other.

Figure 8B:
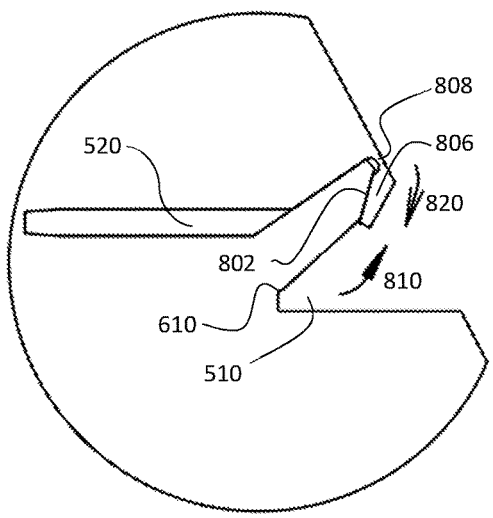
FIG. 8B is a close-up view of the second embodiment of the invention in its post-assembly state.

FIG. 8B shows the same view of the second embodiment of the present invention as FIG. 8A in its post-assembly or deformed state. Once first slots of first panels are inserted into third slots of second panels, the first deformable wall 530 is deformed 810 into the fifth slot 804. The first deformable wall 530 fills a void created by an intersection of the third slots 520 and second slots 404. Once the first deformable wall 530 is in its deformed 810 state, the second deformable wall 806 is deformed 820 such that the second deformable wall 806 comes into contact with the chamfer 802. Once the second deformable wall 806 is in its deformed 820 state, the first and second panels are fixed in position relative to each other at this intersection. The first embodiment of the present invention may be incorporated at any intersection of second and third slots of first and second panels throughout the entire grill assembly. The first embodiment of the present invention may also be used on any grill utilizing a first and second panel and is not limited in scope to a vehicle front grill assembly.

FIG. 9A shows a perspective view of a vehicle rear grill assembly which comprises an upper grill assembly 900 and a lower grill assembly 960. The upper grill assembly 900 further comprises first panels 902, 904, 906, 908, 910, 912, 914, 916, 918, 920, 922, 924, 926, 928, 930 and second panels 934, 935, 936, 938, 940, 942, 944, 946, 948, 950, 952, 954, 956. A first upper grill assembly first panel 902 is a first panel comprising first slots and second slots extending inwards from opposed sides. A second upper grill assembly first panel 904 is a first panel comprising the same features as the first upper grill assembly first panel 902, but having a greater length than the first upper grill assembly first panel 902 and comprising a portion of decreased width 905 in order to interface with a separate assembly, in this case a mounting plate 933. A third upper grill assembly first panel 906 comprises the same features as the first upper grill assembly first panel 902 but further comprises a portion of decreased width 905 to interface with the mounting plate 933. The third upper grill assembly first panel 906 is partially blocked from view in this Figure, but is one continuous piece extending underneath the mounting plate 933 by means of a portion of decreased width 905. A fourth upper grill assembly first panel 908 is a first panel of lesser length than the first upper grill assembly first panel 902 and the second upper grill assembly first panel 904. The fifth upper grill assembly first panel 910 is a first panel of lesser length than the fourth upper grill assembly first panel 908 and comprises a portion of lesser width than the rest of the fifth upper grill assembly first panel 910. A sixth upper grill assembly first panel 912 is a first panel of lesser length than the fifth upper grill assembly first panel 910, and comprises a portion of lesser width than the rest of the sixth upper grill assembly first panel 912 to interface with a separate assembly member, in this case a brake light assembly 932. A seventh upper grill assembly first panel 914 is a first panel of lesser length than the sixth upper grill assembly first panel 912 and comprises a portion of lesser width than the rest of the seventh upper grill assembly first panel 914. An eighth upper grill assembly first panel 916 is a first panel of greater length than the seventh upper grill assembly first panel 914 and lesser length than the sixth upper grill assembly first panel 912. The eighth upper grill assembly first panel 916 further comprises first through holes 917 used to interface the upper grill assembly 900 with vehicle structural frame members. A ninth upper grill assembly first panel 918 is a first panel comprising the same features as the seventh upper grill assembly first panel 914 and additionally comprising a second portion of lesser panel width. A tenth upper grill assembly first panel 920 is a first panel comprising the same features as the sixth upper grill assembly first panel 912 but further comprising a second portion of lesser panel width. An eleventh upper grill assembly first panel 922 is a first panel comprising the same features as the fifth upper grill assembly first panel 910. A twelfth upper grill assembly first panel 924 is a first panel comprising the same features as the fourth upper grill assembly first panel 908. A thirteenth upper grill assembly first panel 926 is a first panel comprising the same features as the twelfth upper grill assembly first panel 924 but having the same length as the third upper grill assembly first panel 906. A fourteenth upper grill assembly first panel 928 is a first panel comprising the same features as the thirteenth upper grill assembly first panel 926 but having the same length as the second upper grill assembly first panel 904. TA fifteenth upper grill assembly first panel 930 is a first panel comprising the same features as the fourteenth upper grill assembly first panel 928 but having the same length as the first upper grill assembly first panel 902. The relative width of first panels 902, 904, 906, 908, 910, 912, 914, 916, 918, 920, 922, 924, 926, 928, 930 generally increases as the vertical position of the panel increases, making the upper grill assembly of a generally curved shape. A first upper grill assembly second panel 934 intersects with first panels 902, 904, 906, 908, 910, 912 by means of a third slot shown hereafter in FIG. 10A. A pair of second upper grill assembly second panels 935 intersect with first panels 902, 904, 906, 908, 910, 912, 916 on one side of the upper grill assembly 900 and with first panels 916, 920, 922, 924, 926, 928, 930 on the other side of the upper grill assembly 900. The second upper grill assembly second panels 935 are greater in length than the first upper grill assembly second panel 934 and further comprise portions of greater width than the first upper grill assembly second panel 934 and portions of lesser width than the first upper grill assembly second panel 934 in order to interface with a vehicle brake light assembly 932 and to interface with the mounting plate 933. A third upper grill assembly second panel 936 intersects with first panels 902, 904, 906, 908, 910, 912, 914, 916. The third upper grill assembly second panel 936 is of greater length than the second upper grill assembly second panels 935 and further comprises a portion of lesser width to interface with the mounting plate 933 and a generally pointed acute corner. A fourth upper grill assembly second panel 938 intersects with first panels 902, 904, 906, 908, 910, 912, 914, 916 and is of greater length than length than the third upper grill assembly second panel 936. The fourth upper grill assembly second panel 938 further comprises a portion of lesser width to interface with the mounting plate 933 and a generally pointed acute corner. A fifth upper grill assembly second panel 940 is of greater length than the second upper grill assembly second panels 935 but lesser length than the third upper grill assembly second panel 936. The fifth upper grill assembly second panel 940 further comprises a generally pointed acute corner. A sixth upper grill assembly second panel 942 intersects with first panels 902, 904, 906, 908, 910, 912, 914, 916 and further comprises bent interfaces 958 which may be used to interface with other assemblies or vehicle structural frame members. A seventh upper grill assembly second panel 944 intersects with first panels 902, 904, 906, 908, 910, 912, 914, 916. An eighth upper grill assembly second panel 946 does not intersect directly with other panels in this figure, but shows the general configuration of third slots and fourth slots which will be shown in greater detail hereafter in FIG. 10A. A ninth upper grill assembly second panel 948 comprises features identical to that of the seventh upper grill assembly second panel 944. A tenth upper grill assembly second panel 950 comprises features identical to that of the sixth upper grill assembly second panel 942 except that bent interfaces 958 are bent in the opposite direction. An eleventh upper grill assembly second panel 952 comprises features identical to that of the fifth upper grill assembly second panel 940. A twelfth upper grill assembly second panel 954 comprises features identical to that of the fourth upper grill assembly second panel 938 except that it has no portion which interfaces with the mounting plate 933 or any other assembly. A thirteenth upper grill assembly second panel 956 comprises features identical to the third upper grill assembly second panel 936 except that it has no portion which interfaces with the mounting plate 933. The second panels 934, 935, 936, 938, 940, 942, 944, 946, 948, 950, 952, 954, 956 are generally curved and generally increase in width along increasing height of the assembly such that the upper grill assembly 900 takes on a generally curved shape. The lower grill assembly 960 is much smaller than the upper grill assembly 900 and comprises fewer panels. A lower first panel 962 is of length that spans the entire lower grill assembly 960 and comprises mounting interfaces 968 to fix the lower grill assembly 960 to vehicle structural frame members by using second through-holes 970. A middle first panel 964 is of length that spans the entire lower grill assembly 960 and is of a generally rectangular shape with a lesser width than that of the lower first panel 962. An upper first panel 966 is of length that spans the entire lower grill assembly 960 and is of a generally rectangular shape with a lesser width than that of the middle first panel 964. The upper first panel 966 is of lesser length than the middle first panel 964. Lower assembly second panels 972 intersect with lower assembly first panels 962, 964, 966 and have a generally triangular shape with a generally curved hypotenuse. Lower assembly second panels 972 are spaced evenly along the length of lower assembly first panels 962, 964, 966 excepting a space in the middle of the lower grill assembly 960 where the space between lower assembly second panels 972 is larger than at any other portion of the lower grill assembly 960.

Figure 9:
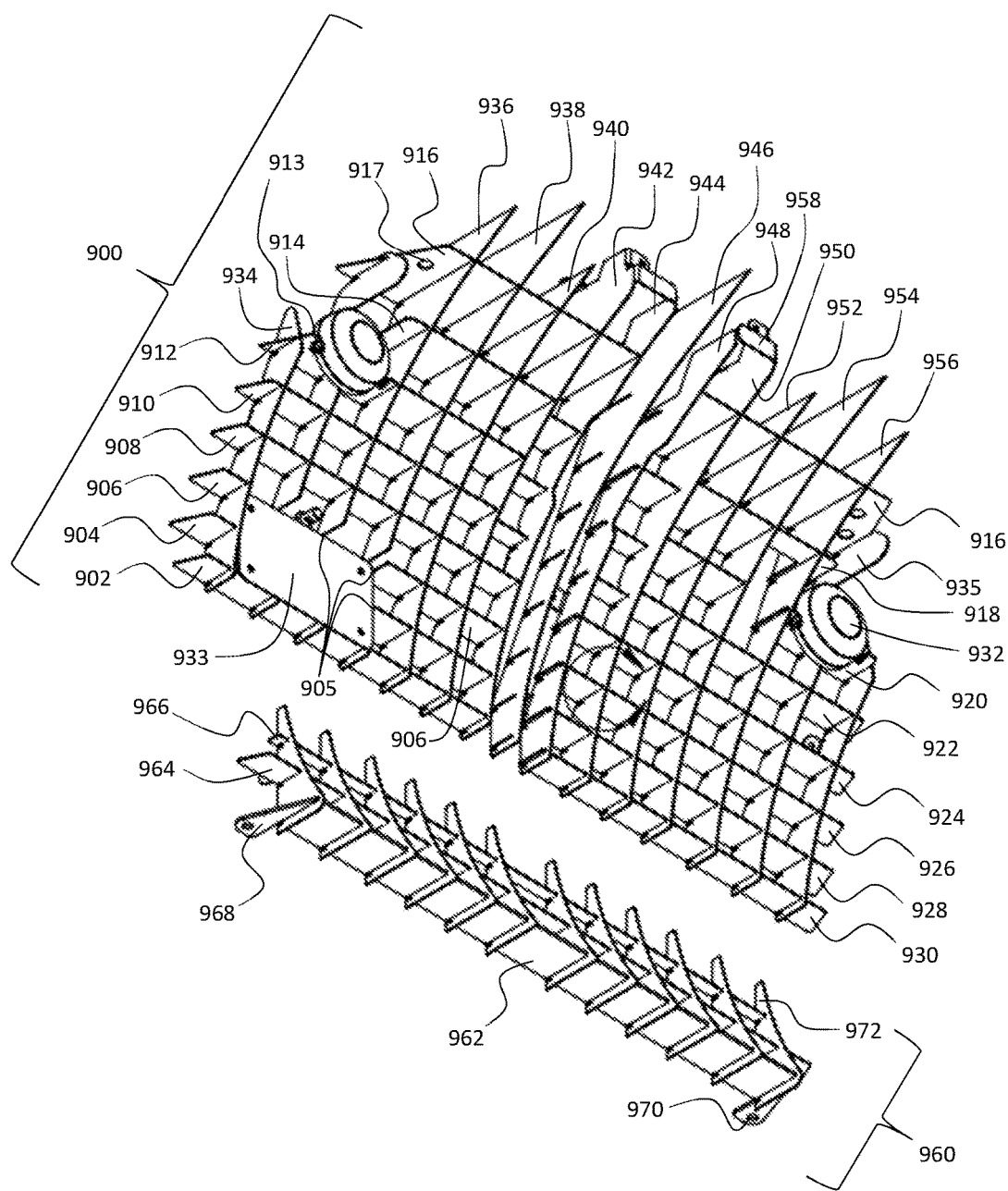
FIG. 9 is a perspective view of a vehicle rear grill assembly utilizing an embodiment of the invention.
Figures 10A, 10B, 10C:
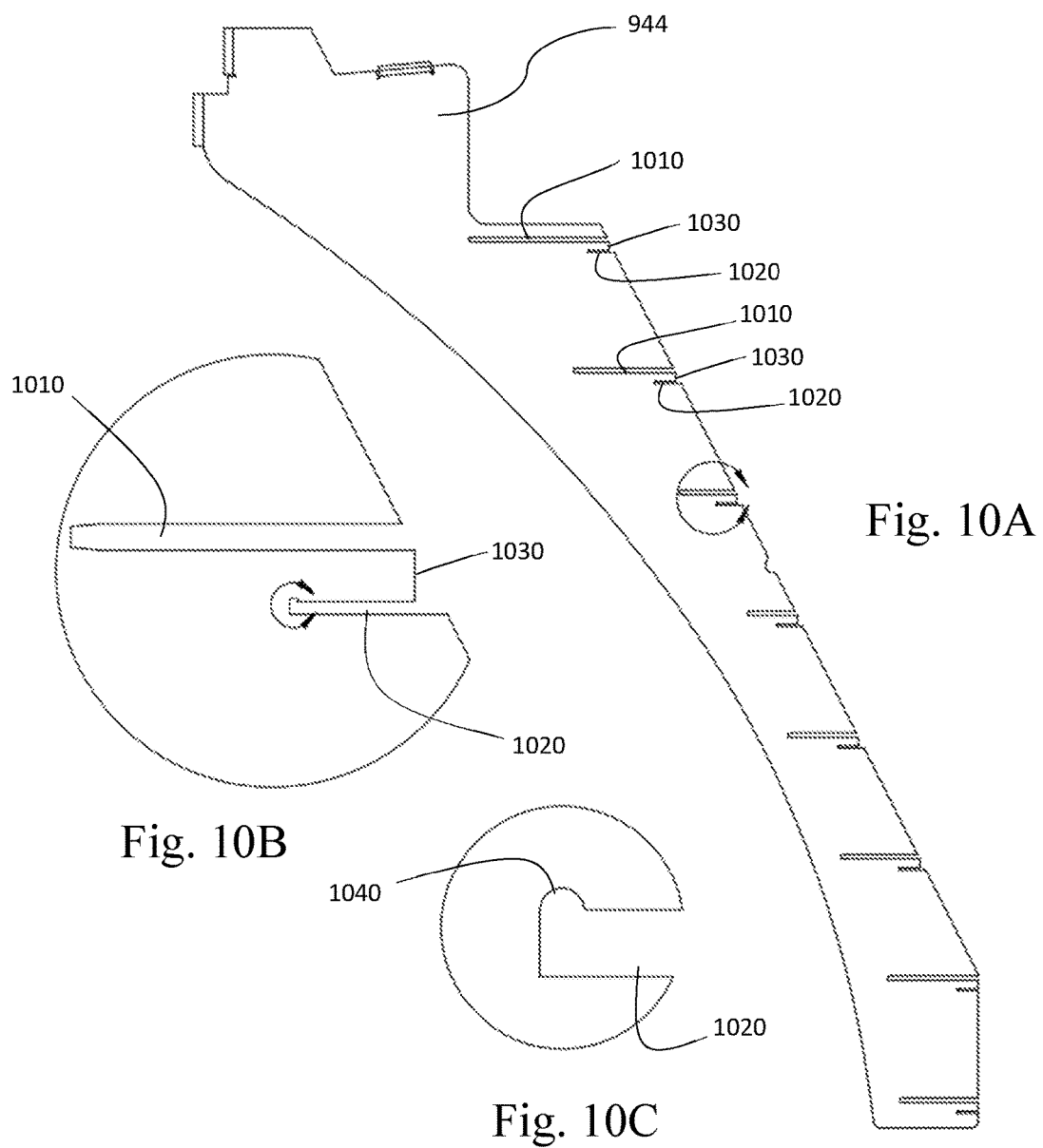
FIG. 10A is a side view of a second panel used in the vehicle rear grill assembly of FIG. 9.
FIG. 10B is a close-up view of a third slot, fourth slot, and first deformable wall of the second panel of FIG. 10A.
FIG. 10C is a close-up view of the fourth slot and a first groove of the fourth slot of FIG. 10B.

FIG. 10A shows a side view of the seventh upper grill assembly second panel 944 shown in FIG. 9. The features of the seventh upper grill assembly second panel 944 shown and described in FIG. 10A, FIG. 10B, and FIG. 10C are representative of features utilized on all second panels in FIG. 9, and as such are understood to not be limited in scope to only the seventh upper grill assembly second panel 944. The seventh upper grill assembly second panel 944 comprises third slots 1010 and fourth slots 1020, which form a first deformable wall 1030 between them. FIG. 10B shows a close-up view of a third slot 1010, fourth slot 1020, and a first deformable wall 1030 formed between on the seventh upper grill assembly second panel 944 of FIG. 10A. FIG. 10C shows a close-up view of the base of a fourth slot 1020, which comprises a first groove 1040. The third slot 1010, fourth slot 1020, first deformable wall 1030, and first groove 1040 are the same features as those found in the first embodiment of the invention in FIG. 7A, which shows the third slot 520, fourth slot 510, first deformable wall 530, and first groove 610. As such, in reference to FIG. 9, first panels 902, 904, 906, 908, 910, 912, 914, 916, 918, 920, 922, 924, 926, 928, 930 and second panels 934, 935, 936, 938, 940, 942, 944, 946, 948, 950, 952, 954, 956 are understood to intersect by the same embodiments and methods described heretofore and depicted in FIGS. 7A, 7B, 8A, and 8B.

Figure 11A:
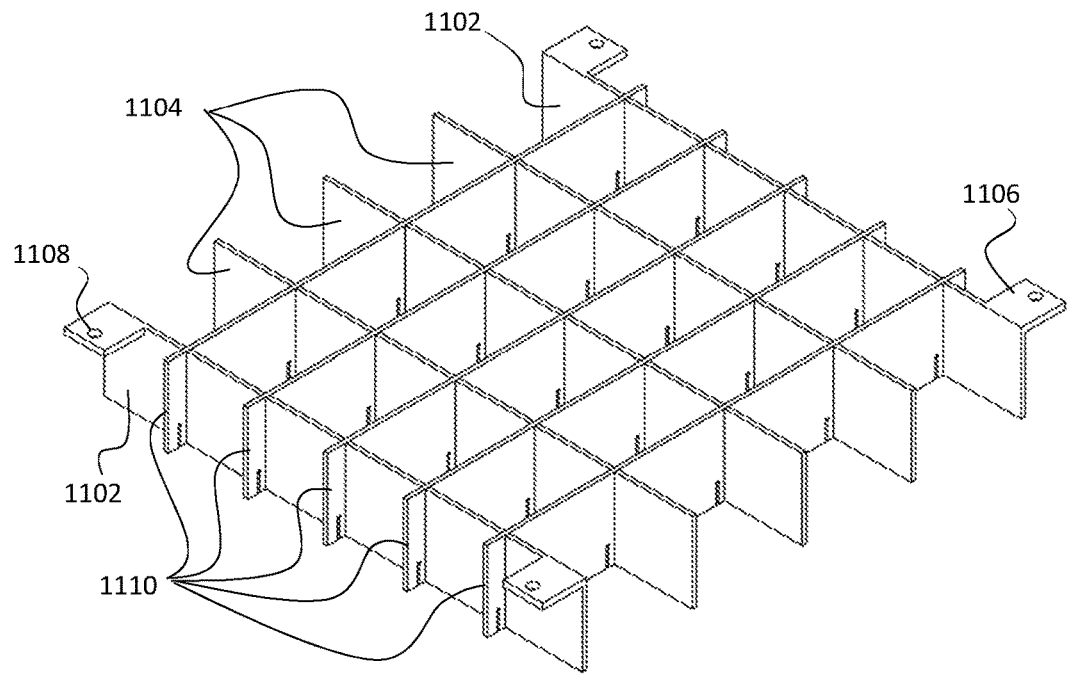
FIG. 11A shows a perspective view of a ventilation grill assembly utilizing an embodiment of the present invention.

FIG. 11A shows a perspective view of a ventilation grill assembly utilizing the present invention. The ventilation grill assembly comprises of first panels 1102, 1104 and second panels 1110. Outer first panels 1102 are rectangular in shape and have a length that spans the entire length of the ventilation grill assembly. The outer first panels 1102 each additionally comprise first slots and second slots extending inwards from opposed sides of the panels and sharing an inline longitudinal axis, as well as bent mounting extensions 1106 which protrude perpendicularly from the side of the outer first panels 1102. The bent mounting extensions 1106 further comprise mounting through-holes 1108 which may be used to rigidly attach the ventilation grill assembly to a vent opening. Inner first panels 1104 are identical to the outer first panels 1102 except they do not comprise bent mounting extensions 1106. In the ventilation grill assembly depicted in FIG. 11A, only one shape and size of second panel 1110 is utilized. The first panels 1102, 1104 are intersected with second panels in a manner more fully illustrated and described hereafter.

Figure 11B:
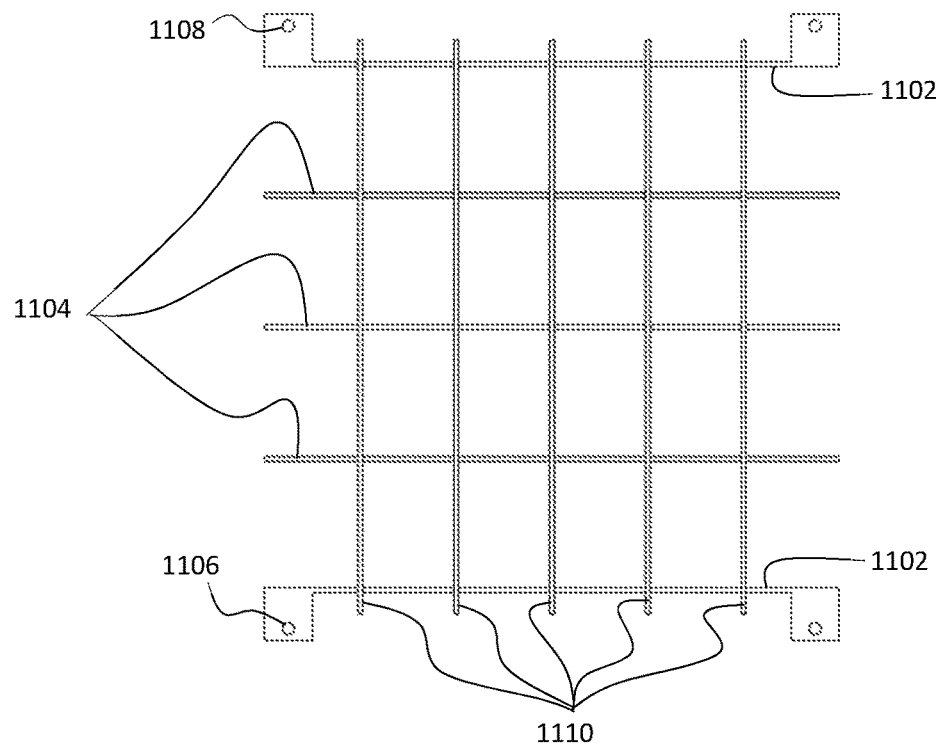
FIG. 11B shows a top-down view of the ventilation grill assembly of FIG. 11A.

FIG. 11B shows a top-down view of the ventilation grill assembly of FIG. 11A. This view shows that the ventilation grill assembly comprises first panels 1102, 1104 and second panels 1110 intersected in a perpendicular manner with like panels being spaced evenly relative to one another throughout the ventilation grill assembly.

Figure 12:
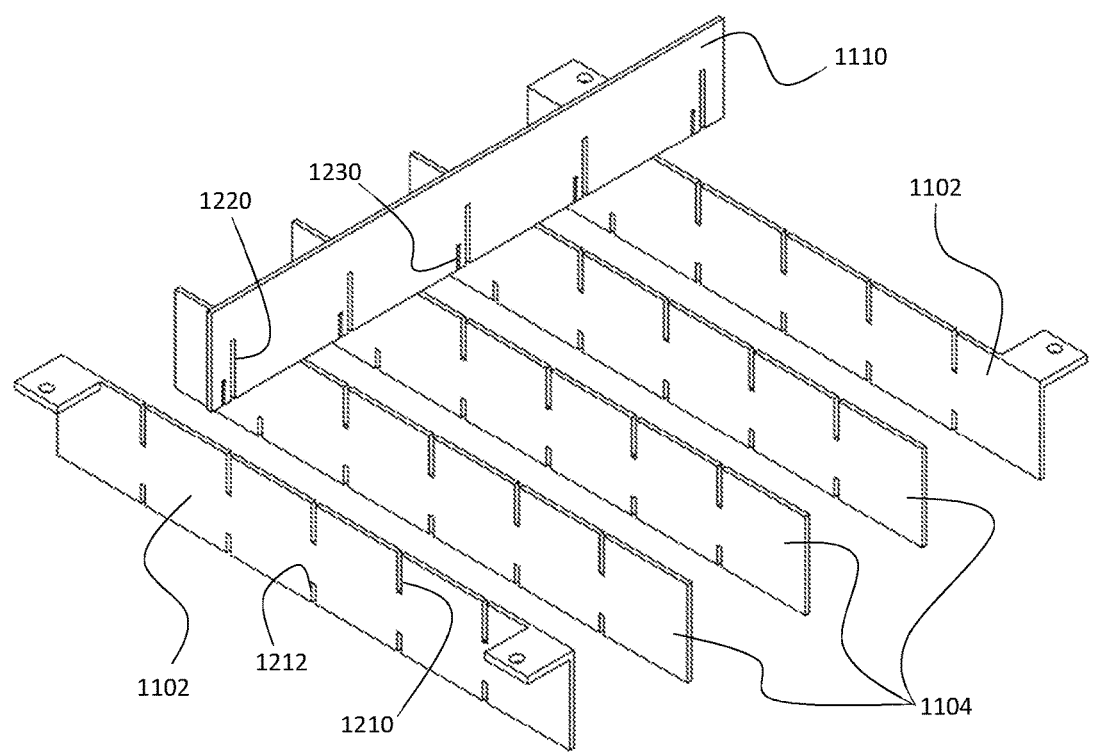
FIG. 12 shows a partially assembled ventilation grill assembly.

FIG. 12 shows a perspective exploded view of the ventilation grill assembly of FIG. 11A with only one second panel 1110. The first panels 1102, 1104 are comprised of first slots 1210 and second slots 1212 extending inward from opposed sides. The second panels 1110 are comprised of third slots 1220 and fourth slots 1230. As shown hereafter in FIG. 15B, intersections of first panels 1102, 1104 and second panels 1110 comprise the insertion of first slots 1210 into third slots 1220.

Figure 13:
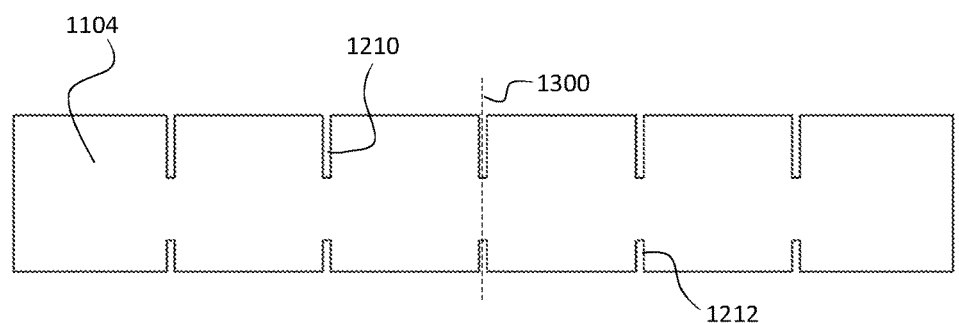
FIG. 13 shows a side view of a first panel of the ventilation grill assembly of FIG. 11A.

FIG. 13 shows a side view of an inner first panel 1104. The first slots 1210 and second slots 1212 extend inward from opposed sides of the inner first panel 1104 and share an inline longitudinal axis. In addition, first slots 1210 and second slots 1212 are spaced evenly such that the completed ventilation grill assembly takes on an evenly spaced appearance. First slots 1210 and second slots 1212 share an inline longitudinal axis 1300.

FIG. 14A shows a side view of the second panel 1110. The second panel 1110 is comprised of third slots 1220 and fourth slots 1230, which form a first deformable wall 1410 between them. FIG. 14B shows a close-up view of the third slots 1220, fourth slots 1230, and first deformable wall 1410 of FIG. 14A. FIG. 14C shows a close-up view of the fourth slot 1230 shown in FIG. 14B and shows that fourth slots 1230 further comprise a first groove 1420 at the base of the fourth slot 1230. The first groove 1420 facilitates deformation of the first deformable wall as depicted in FIGS. 7A and 7B. It should be understood that although FIGS. 14A, 14B, and 14C show second panels 1110 utilizing the first embodiment of the invention as shown in FIGS. 7A and 7B, other embodiments, such as the one shown in FIGS. 8A and 8B are possible and may also be utilized on second panels 1110 of this or any other grill assembly.

Figure 15A:
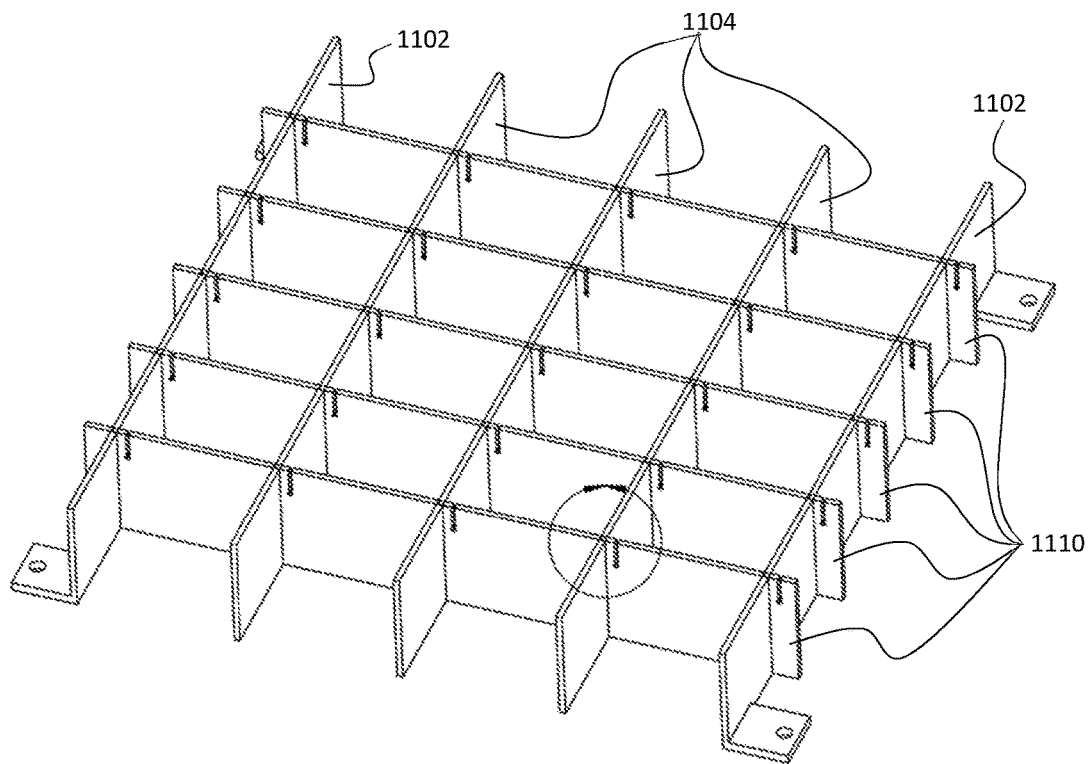
FIG. 15A shows a perspective view of a ventilation grill assembly utilizing an embodiment of the present invention.
Figure 15B:
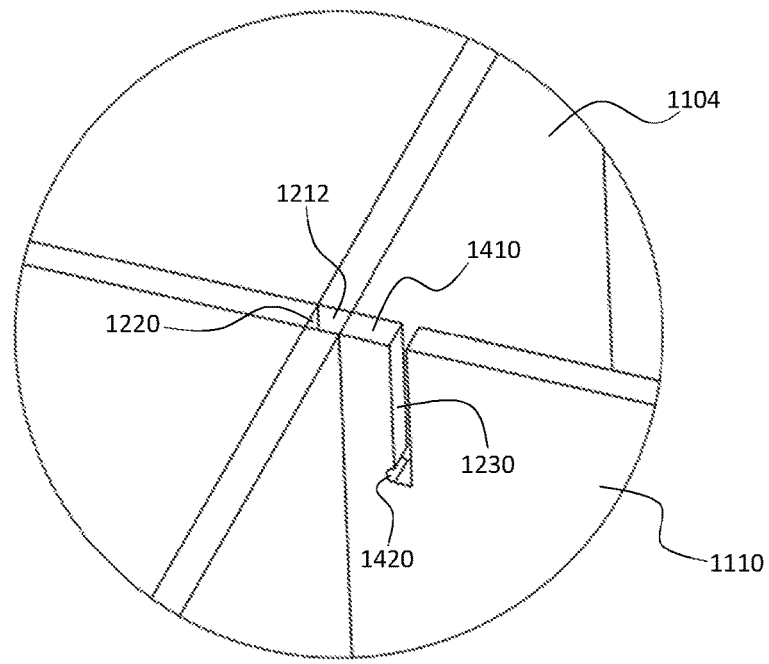
FIG. 15B shows a close-up view of an intersection of first and second slots of the ventilation grill assembly of FIG. 15A.

FIG. 15A shows a perspective view of the bottom of the ventilation grill assembly of FIG. 11A. FIG. 15B shows a close-up view of an intersection of an inner first panel 1104 and a second panel 1110. After insertion of the first slot 1210 of the inner first panel 1104 into the third slot 1220 of the second panel 1110, an empty void is formed at the intersection of the second slot 1212 and the third slot 1220. This void is of equal width to the first deformable wall 1410. Upon deformation of the first deformable wall as depicted in FIG. 7B, the first deformable wall 1410 fits into and fills the void 1212, 1220 by bending at the first groove 1420. The filling of this void 1212, 1220 by the first deformable wall causes the inner first panel 1104 and the second panel 1110 to become fixed in position relative to each other at this intersection. Each intersection of first panels 1102, 1104 and second panels 1110 throughout the ventilation grill assembly should be understood to have the same features as the one depicted in FIG. 15B, and the filling of all voids 1212, 1220 in the entire ventilation grill assembly rigidly fixes first panels 1102, 1104 and second panels 1110 in their positions relative to each other.

The invention claimed is:

1. A method of assembling a grill assembly comprising:
providing a plurality of first panels each comprising a plurality of first slots and a plurality of second slots, the plurality of first slots having a different depth than the depth of the plurality of second slots, the plurality of first slots and the plurality of second slots extending inwards from opposed sides and sharing an inline longitudinal axis;
providing a plurality of second panels comprising a plurality of third slots and a plurality of fourth slots, the plurality of third slots extending a depth from a side of the plurality of second panels, the plurality of fourth slots being adjacent to the plurality of third slots and extending a lesser depth than the plurality of third slots, and the third slots and the fourth slots being separated by a first deformable wall comprising a first groove;

inserting the first slots of the first panels into the third slots of the second panels; and deforming the first deformable wall such that the plurality of first panels and the plurality of second panels are fixed in position relative to one another.

2. The method of claim 1, wherein the plurality of first panels and the plurality of second panels are composed of a lightweight material such as an aluminum alloy.

3. The method of claim 1, wherein the plurality of first panels, the plurality of second panels, and their respective features are formed by cutting a sheet of material with a laser.

4. The method of claim 1, wherein the completed assembly is powder coated.

5. The method of claim 1, wherein the first panels further comprise mounting interfaces to mount the grill assembly to a separate structural frame member.

6. The method of claim 1, wherein the second panels further comprise mounting interfaces to mount the grill assembly to a separate structural frame member.

7. The method of claim 1, wherein the first panels further comprise mounting interfaces to mount separate assemblies to the grill assembly.

8. The method of claim 1, wherein the second panels further comprise mounting interfaces to mount separate assemblies to the grill assembly.

9. The method of claim 1, wherein the first panels are wider than the second panels and protrude further from the completed assembly than the second panels.

10. The method of claim 1, wherein the second panels are wider than the second panels and protrude further from the completed assembly than the first panels.

11. The method of claim 1, wherein the first panels are generally curved and cause the completed assembly to take on a generally curved shape.

12. The method of claim 1, wherein the second panels are generally curved and cause the completed assembly to take on a generally curved shape.

13. The method of claim 1, wherein the completed assembly is mounted to the front of a vehicle.

14. The method of claim 1, wherein the completed assembly is mounted to the rear of a vehicle.

15. The method of claim 1, wherein first slots are spaced evenly relative to each other on each first panel, causing the plurality of second panels to be spaced evenly relative to one another throughout the grill assembly.

16. The method of claim 1, wherein third slots are spaced evenly relative to each other on each second panel, causing the plurality of first panels to be spaced evenly relative to one another throughout the grill assembly.

17. The method of claim 1, wherein some first panels comprise a portion of decreased width to interface with separate assembly members.

18. The method of claim 1, wherein some second panels comprise a portion of decreased width to interface with separate assembly members.

19. A grill assembly comprising:

a plurality of first panels each comprising a plurality of first slots and a plurality of second slots, the plurality of first slots having a different depth than the depth of the plurality of second slots;

the plurality of first slots and the plurality of second slots extending inwards from opposed sides of the first panels and sharing an inline longitudinal axis;

a plurality of second panels comprising a plurality of third slots and a plurality of fourth slots;

the plurality of third slots extending a depth from a side of the plurality of second panels;

the plurality of fourth slots being adjacent to the plurality of third slots and extending a lesser depth than the plurality of third slots;

the third slots and the fourth slots being separated by a first deformable wall comprising a first groove, and wherein the first slots of the first panels are inserted into the third slots of the second panels and fixed in place by deformation of the first deformable walls at the first grooves.

20. A method of assembling a grill assembly comprising:

providing a plurality of first panels each comprising a plurality of first slots and a plurality of second slots, the plurality of first slots having a different depth than the depth of the plurality of second slots, the plurality of first slots and the plurality of second slots extending inwards from opposed sides and sharing an inline longitudinal axis;

providing a plurality of second panels comprising a plurality of third slots and a plurality of fourth slots, the plurality of third slots extending a depth from a side of the plurality of second panels, the plurality of fourth slots being adjacent to the plurality of third slots and extending a lesser depth than the plurality of third slots, the third slots and the fourth slots being separated by a first deformable wall comprising a first groove, the first deformable wall having a chamfer at its corner nearest the fourth slot, the plurality of third slots further comprising fifth slots offset from an edge of the plurality of second panels and forming a second deformable wall comprising a second groove, the fifth slots being shaped such that when the first deformable wall is in a deformed state the fifth slots fit the shape of at least part of the first deformable walls;

inserting the first slots of the first panels into the third slots of the second panels;

deforming the first deformable walls into intersections of the first slots of the first panels and the third slots of the second panels and further into the fifth slots of the second panels;

deforming the second deformable walls into the fifth slots until the second deformable walls come into contact with the chamfer of the first deformable walls.

* * * * *